(12) United States Patent
Takemura

(10) Patent No.: US 8,474,992 B2
(45) Date of Patent: Jul. 2, 2013

(54) LIGHTING DEVICE, AND DISPLAY APPARATUS PROVIDING LIGHTING DEVICE

(75) Inventor: Hideo Takemura, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 133 days.

(21) Appl. No.: 12/939,859

(22) Filed: Nov. 4, 2010

(65) Prior Publication Data

US 2011/0109814 A1  May 12, 2011

(30) Foreign Application Priority Data

Nov. 6, 2009  (JP) ................................. 2009-254999

(51) Int. Cl.
*G02F 1/13357* (2006.01)
(52) U.S. Cl.
USPC ................... 362/97.3; 362/97.2; 362/249.06; 349/62; 349/63
(58) Field of Classification Search
USPC ............... 362/97.1–97.4, 612, 613, 630, 631, 362/249.02, 249.06; 349/62, 63, 67
See application file for complete search history.

(56) References Cited

U.S. PATENT DOCUMENTS

| | | | |
|---|---|---|---|
| 7,648,254 B2 | 1/2010 | Yoo et al. | |
| 2010/0045898 A1* | 2/2010 | Lee et al. | 349/65 |
| 2010/0225572 A1* | 9/2010 | Suminoe et al. | 345/102 |
| 2010/0265432 A1* | 10/2010 | Masuda et al. | 349/62 |
| 2010/0283920 A1 | 11/2010 | Kunii | |
| 2010/0296270 A1 | 11/2010 | Gomi et al. | |
| 2011/0001899 A1* | 1/2011 | Ajichi et al. | 349/62 |

FOREIGN PATENT DOCUMENTS

| | | |
|---|---|---|
| CN | 1896838 | 1/2007 |
| JP | 2006-58485 | 3/2006 |
| JP | 2007-114590 | 5/2007 |
| JP | 2007-288194 | 11/2007 |
| JP | 2008-147147 | 6/2008 |
| WO | WO-2009/093363 | 7/2009 |
| WO | WO-2009/093583 | 7/2009 |

* cited by examiner

*Primary Examiner* — Thomas Sember
(74) *Attorney, Agent, or Firm* — Morrison & Foerster LLP

(57) ABSTRACT

A lighting device comprising:
a light emitting module including a plurality of electrically connected light emitting bars each having a plurality of semiconductor light emitting devices;
a chassis for containing the light emitting module and having a discharge opening;
a reflection sheet arranged in the chassis; and
a brightness nonuniformity reduction unit,
wherein the light emitting bar includes:
a band plate-shaped substrate;
a wiring formed on one surface of the substrate;
the plurality of semiconductor light emitting devices; and
first and second connectors formed in proximity to opposing shorter sides on the one surface of the substrate,
wherein the reflection sheet has at least a plurality of corresponding holes through which the plurality of semiconductor light emitting devices are inserted,
and wherein the brightness nonuniformity reduction unit is arranged in proximity to a position of the first and second connectors of each light emitting bar.

9 Claims, 11 Drawing Sheets

LIGHTING DEVICE, AND DISPLAY APPARATUS PROVIDING LIGHTING DEVICE

CROSS-REFERENCE TO RELATED APPLICATION

This application is related to Japanese Patent Application No. 2009-254999 filed on Nov. 6, 2009, whose priority is claimed under 35 USC §119, the disclosure of which is incorporated by reference in its entirety.

BACKGROUND OF THE INVENTION

1. Field of the Invention

The present invention relates to a lighting device, a display apparatus providing the lighting device, and a television receiver providing the display apparatus.

2. Description of the Related Art

Recently, a direct backlight LED lighting device (hereinafter referred to as "direct backlight device") attracts people's attention. In the direct backlight device, light emitting diodes (hereinafter referred to as "LEDs") are arranged on the entire back surface of a liquid crystal panel as a backlight of the liquid crystal display apparatus.

The following direct backlight device has been suggested. In an LED module equipped with a plurality of LEDs arranged in a plurality of rows, a box-shaped connector is arranged close to one side or two opposing sides of a rectangular substrate of the LED module. The LED modules are arranged in two-dimensional directions (vertical direction and horizontal direction), and connectors of the LED modules adjacent to each other in one direction are electrically connected, so that a plurality of sizes can be supported (Conventional technique 1: for example, see FIG. 1a and FIG. 1b in Japanese Unexamined Patent Publication No. 2007-288194).

In the conventional technique 1, a drive circuit connector is arranged on one side of a substrate of an LED module at one end of the plurality of electrically-connected LED modules.

In the direct backlight device of the conventional technique 1, connectors protrude from the upper surface of the substrate. A part of the light emitted from an LED is absorbed by a housing of the connector, which reduces a brightness around the connector, and the connector serves as a barrier to prevent a diffusion of light. Due to the above reasons, a nonuniformity of brightness occurs.

Accordingly, conventional technique 2 has been suggested in order to solve this nonuniformity of brightness (for example, see FIG. 2A and FIG. 2B in Japanese Unexamined Patent Publication No. 2007-288194). In the conventional technique 2, a back wiring, instead of the connector, is formed on the back surface of the substrate of each LED module. The back wirings of the LED modules adjacent to each other in one direction are electrically connected, and each LED module is electrically connected to the drive circuit connector.

However, in the conventional technique 2, the back wiring has a particular pattern shape determined based on the number of LED modules arranged in one direction, and the back wiring of each LED module has a different pattern shape. Therefore, when the number of LED modules arranged in one direction is changed, it is necessary to prepare an LED module having a back wiring having a pattern shape corresponding to the number of the LED modules.

Moreover, in the conventional technique 1 and the conventional technique 2, a liquid crystal panel smaller than an LED module cannot be supported, and a liquid crystal panel having a size other than integral multiples of the size of the LED module cannot be supported (for example, 1.5 times, 2.5 times, and 3.5 times larger than the LED module).

Therefore, in order to various sizes of liquid crystal panels, it is necessary to increase the types of sizes of the LED modules. However, this would increase the production cost.

SUMMARY OF THE INVENTION

The present invention has been made in view of the above problems, and it is an object of the present invention to provide a lighting device capable of reducing the nonuniformity of brightness and supporting handling various sizes and shapes without increasing the production cost.

Therefore, the present invention provides a lighting device comprising:

a light emitting module including a plurality of electrically connected light emitting bars each having a plurality of semiconductor light emitting devices;

a chassis for containing the light emitting module and having a discharge opening for discharging light from each semiconductor light emitting device to an outside;

a reflection sheet arranged in the chassis to reflect the light of the plurality of semiconductor light emitting devices to a side of the discharge opening, and a brightness nonuniformity reduction unit, wherein the light emitting bar includes:

a band plate-shaped substrate;

a wiring (wiring pattern) formed to extend in a longitudinal direction on one surface of the substrate;

the plurality of semiconductor light emitting devices arranged in one row on the one surface of the substrate and electrically connected to the wire; and first and second connectors formed in proximity to opposing shorter sides on the one surface of the substrate and electrically connected to the wiring, wherein the light emitting module is formed in a bar shape by electrically connecting the first connector and the second connector of two light emitting bars adjacent to each other when the plurality of light emitting bars are arranged in a longitudinal direction, wherein the reflection sheet has at least a plurality of corresponding holes through which the plurality of semiconductor light emitting devices are inserted, and the reflection sheet is arranged on the one surface of the substrate of the light emitting module while the semiconductor light emitting devices are inserted into the corresponding holes, and wherein the brightness nonuniformity reduction unit is arranged in proximity to a position of the first and second connectors of each light emitting bar, and the brightness nonuniformity reduction unit is structured to reflect the lights emitted by the semiconductor light emitting devices toward the first and second connectors to suppress a decrease in brightness therearound.

The lighting device according to the present invention achieves the following effects.

(1) The light emitting bar has the pair of connectors. Therefore, by connecting the connectors of the light emitting bars, a desired length of light emitting module can be easily assembled. In other words, a lighting device of various lengths can be easily obtained.

(2) A lighting device of various sizes and shapes can be obtained according to the number of semiconductor light emitting devices per light emitting bar, a length of the light emitting bar, the number of light emitting bars constituting the light emitting module, the number of light emitting modules, arrangement patterns of the light emitting modules, and combinations of these.

(3) Each light emitting bar constituting the light emitting module can have the same structure and is the smallest unit light source. Therefore, a lighting device of various sizes and shapes can be obtained without increasing the production cost.

(4) The brightness nonuniformity reduction unit is arranged on each of the first and second connectors of the light emitting module. Therefore, the nonuniformity of brightness is reduced on the light emitting surface of the lighting device.

In other words, if there is no brightness nonuniformity reduction unit, a part of the light emitted by the semiconductor light emitting device and incident upon the first and second connectors is absorbed by the first and second connectors. Therefore, the brightness of the portion on the light emitting surface of the lighting device corresponding to the first and second connectors becomes less than the brightness of the other portions. As a result, a nonuniformity of brightness occurs on the light emitting surface.

According to the present invention, the light emitted by the semiconductor light emitting device to the first and second connectors can be reflected by the brightness nonuniformity reduction unit with a high reflectivity. Therefore, the brightness of the portion on the light emitting surface of the lighting device corresponding to the first and second connectors is prevented from decreasing to a brightness less than the brightness of the other portions. As a result, an nonuniformity of brightness on the light emitting surface can be reduced.

(5) The lighting device can be obtained in which the nonuniformity of brightness is reduced. Therefore, when this lighting device is used, a display apparatus and a television receiver can be obtained in which the nonuniformity of brightness is reduced.

DETAILED DESCRIPTION OF THE PREFERRED EMBODIMENTS

Figure 1:
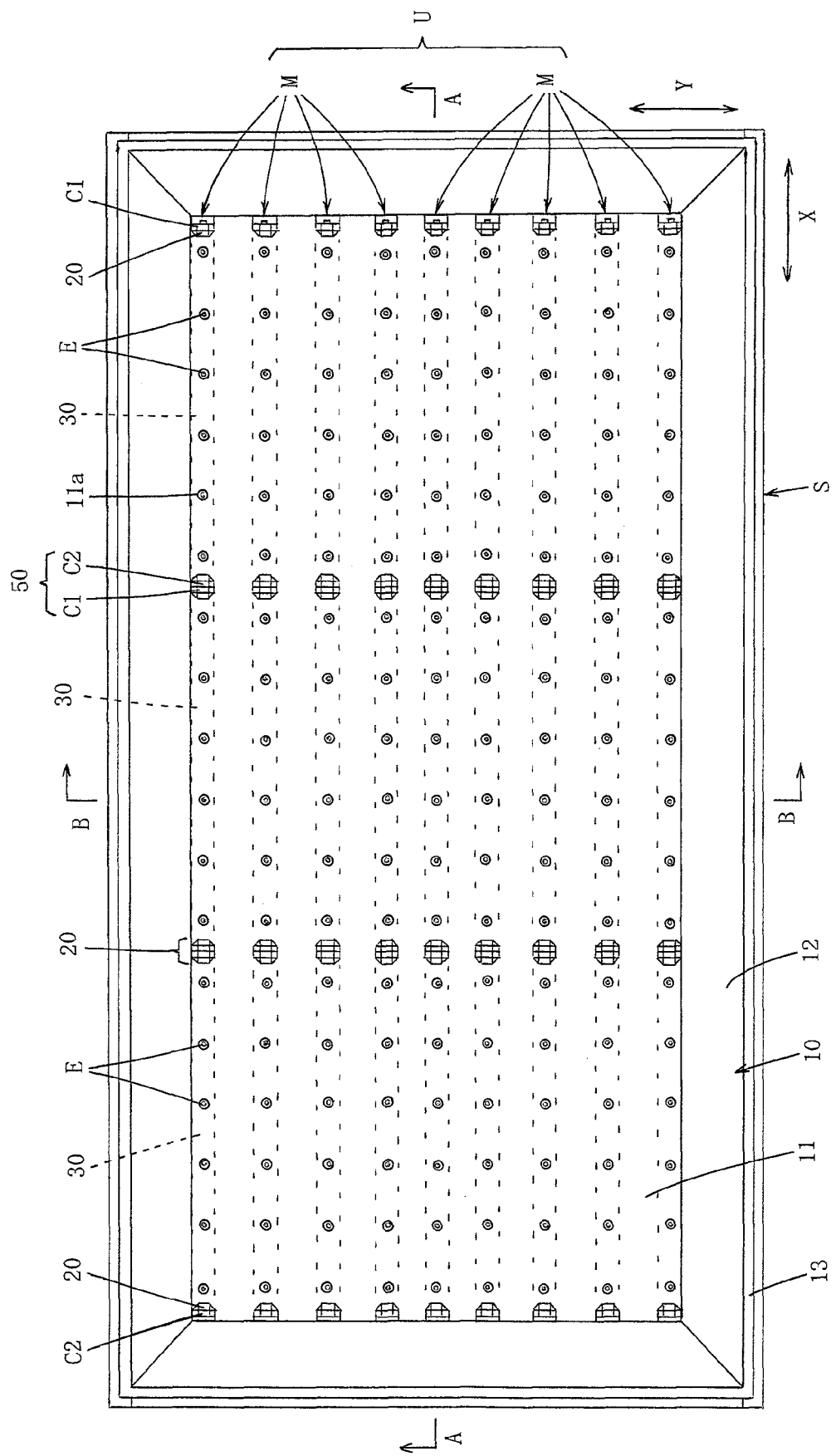
FIG. 1 is a plan view illustrating a first embodiment of a lighting device according to the present invention and a display apparatus using the lighting device.

A lighting device according to the present invention includes at least a chassis, one or more light emitting modules, a reflection sheet, and a brightness nonuniformity reduction unit.

The light emitting module is electrically connected to a plurality of light emitting bars having a plurality of semiconductor light emitting devices.

The chassis containing the light emitting modules and has discharge openings for discharging light from each semiconductor light emitting device to the outside.

The reflection sheet arranged in the chassis and reflects the lights of the plurality of semiconductor light emitting devices to the side of the discharge openings.

The light emitting bar includes a band plate-shaped substrate, a wiring formed to extend in a longitudinal direction on a surface of the substrate, the plurality of semiconductor light emitting devices arranged in one row on the surface of the substrate and electrically connected to the wiring, and first and second connectors formed in proximity to opposing shorter sides on the surface of the substrate and electrically connected to the wiring.

The light emitting module is formed in a bar form by electrically connecting the first connector and the second connector of two light emitting bars adjacent to each other with the plurality of light emitting bars being arranged in the longitudinal direction.

The reflection sheet has at least a plurality of corresponding holes through which the plurality of semiconductor light emitting devices are inserted, wherein the reflection sheet is arranged on the surface of the substrate of the light emitting module with the holes being inserted into the semiconductor light emitting devices.

The brightness nonuniformity reduction unit is arranged in proximity to the position of the first and second connectors of the light emitting bars, and is structured to reflect the lights emitted by the semiconductor light emitting devices toward the first and second connectors to suppress a decrease in brightness thereround.

In a case where the lighting device includes only one light emitting module, the light emitting module is effective as the lighting device for illuminating a small area in a long and narrow shape, in place of a fluorescent light.

Two or more light emitting modules may be arranged in parallel within the chassis. In this case, when the number of light emitting modules, the number of light emitting bars constituting the light emitting module, and the like are increased or decreased, a lighting device appropriate for a size and a shape of an area to be illuminated can be provided, and a lighting device of various sizes serving as a direct backlight device for a display apparatus can be provided. In this case, it is preferable to integrally form the reflection sheet all over the light emitting region of the light emitting unit, since lights can be reflected between the adjacent light emitting modules without increasing the number of parts.

In the present invention, the brightness nonuniformity reduction unit can be structured as follows.

(A) The brightness nonuniformity reduction unit includes inclined surface portions covering a step between the first connector and the substrate and a step between the second connector and the substrate.

With this structure, a direct light emitted from the semiconductor light emitting device toward the first and second connectors can be reflected in a directly upward direction by the inclined surface portions of the brightness nonuniformity reduction unit. Therefore, the nonuniformity of brightness can be further reduced.

Further, since the brightness nonuniformity reduction unit is integrally arranged with the reflection sheet, the number of parts does not increase.

(B) The brightness nonuniformity reduction unit has a bent covering portion made by forming a cutout in a portion of the reflection sheet corresponding to the first and second connectors and bending the cutout portion so as to cover external surfaces of the first and second connectors.

Even with the above structure, since the brightness nonuniformity reduction unit is integrally arranged with the reflection sheet, the number of parts does not increase.

In the cases (A) and (B), the first and second connectors have exposed surfaces that are not covered by the brightness nonuniformity reduction units. Therefore, it is preferable to laminate high reflectance films on the exposed surfaces of the first and second connectors in order to further reduce the nonuniformity of brightness.

(C) The brightness nonuniformity reduction unit includes an opening portion formed in a portion of the reflection sheet corresponding to the first and second connectors and a reflection cap covering the entire first and second connectors protruding from the opening portion and having inclined surface portions covering a step between the first connector and the substrate and a step between the second connector and the substrate.

With this structure, the entire first and second connectors can be covered with the reflection cap. Moreover, since the brightness nonuniformity reduction unit has the inclined surface portions, the nonuniformity of brightness can be further reduced.

(D) The brightness nonuniformity reduction unit of the above (A) is formed in a shape covering the entire first and second connectors.

This structure also enables the entire first and second connectors to be covered with the brightness nonuniformity reduction unit. Therefore, the nonuniformity of brightness can be further reduced.

(E) The first and second connectors have block-shaped housings, and the brightness nonuniformity reduction unit includes an opening portion formed in a portion of the reflection sheet corresponding to first and second connectors and allowing the first and second connectors to protrude from the opening portion and a reflection film laminated on external surfaces of the housings of the first and second connectors protruding from the opening portion.

This structure does not increase the number of parts. In addition, this structure enables easily forming the reflection sheet.

In this case, in order to prevent an increase of production steps, it is preferable to integrally form the reflection film during resin formation of the housings of the first and second connectors.

(F) The first and second connectors have block-shaped transparent housings made of an optically transparent resin. The brightness nonuniformity reduction unit has an opening portion formed in a portion of the reflection sheet corresponding to first and second connectors and allowing the first and second connectors to protrude from the opening portion and a reflection film laminated at a position of the one surface of the substrate corresponding to the first and second connectors.

This structure does not increase the number of parts. In addition, this structure enables easily forming the reflection sheet.

In the cases (E) and (F), in order to easily form the reflection film having a high reflectivity, it is preferable to make the reflection film with a white resin film.

Specific embodiments of a lighting device according to the present invention will be hereinafter described with reference to the drawings.

First Embodiment

Figure 2:
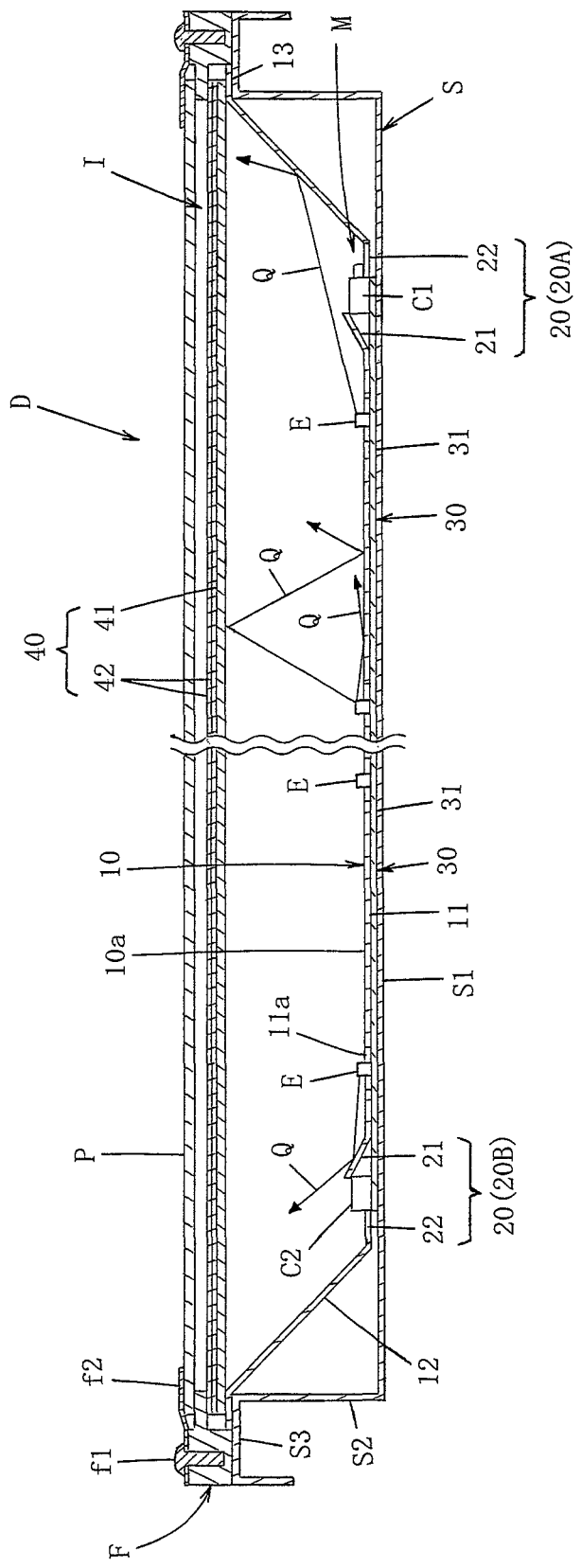
FIG. 2 is a cross sectional view taken along line A-A shown in FIG. 1, wherein an intermediate portion is not shown.
Figure 3:
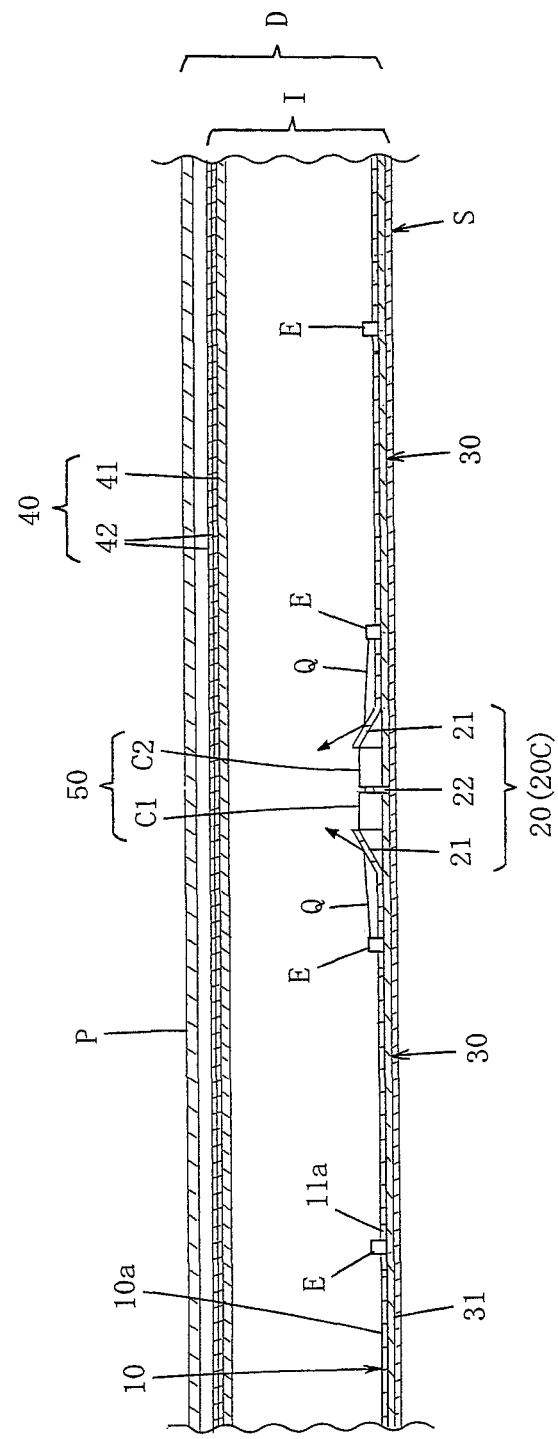
FIG. 3 is a cross sectional view taken along line A-A shown in FIG. 1, wherein both end portions are not shown.
Figure 4:
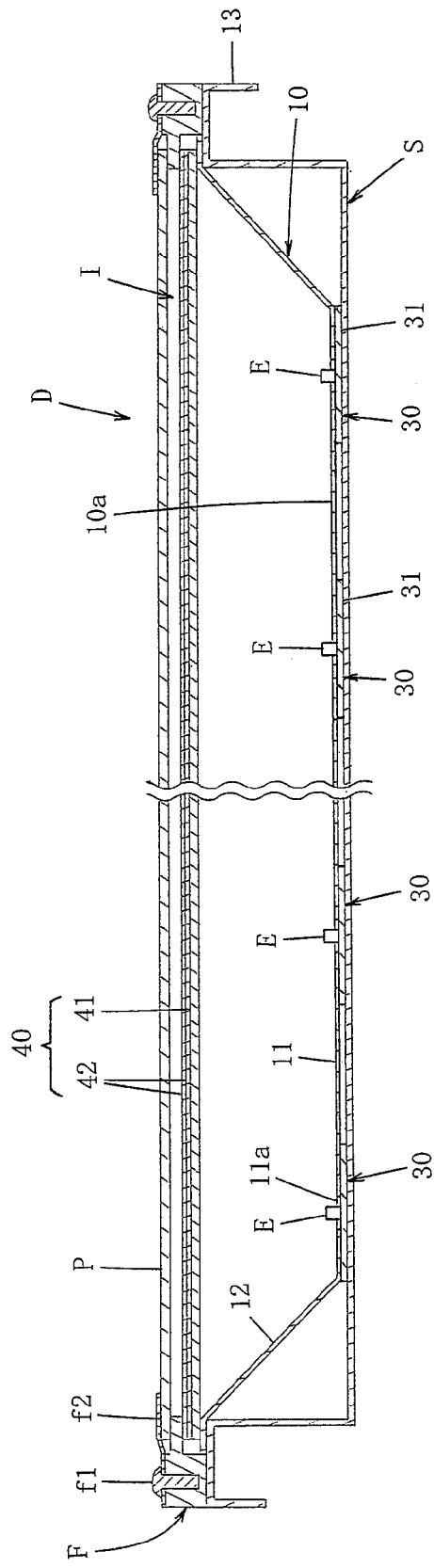
FIG. 4 is a cross sectional view taken along line B-B shown in FIG. 1, wherein an intermediate portion is not shown.

FIG. 1 is a plan view illustrating a first embodiment of a lighting device according to the present invention and a display apparatus using the lighting device. FIG. 2 is a cross sectional view taken along line A-A shown in FIG. 1, wherein an intermediate portion is not shown. FIG. 3 is a cross sectional view taken along line A-A shown in FIG. 1, wherein both end portions are not shown. FIG. 4 is a cross sectional view taken along line B-B shown in FIG. 1, wherein an intermediate portion is not shown.

A lighting device I is used as a direct backlight device of a display apparatus D. The lighting device I includes a chassis S, a planar light emitting unit U housed in the chassis S, a reflection sheet 10 arranged on the light emitting surface side of the planar light emitting unit U, and a brightness nonuniformity reduction unit 20.

The planar light emitting unit U includes a plurality of light emitting modules arranged in parallel in the chassis S in a lateral direction (in a direction of an arrow Y) of the chassis S. The light emitting module includes a plurality of band plate-shaped light emitting bars 30, which have semiconductor light emitting devices E, electrically connected in a longitudinal direction thereof (in a direction of an arrow X).

Figure 8:
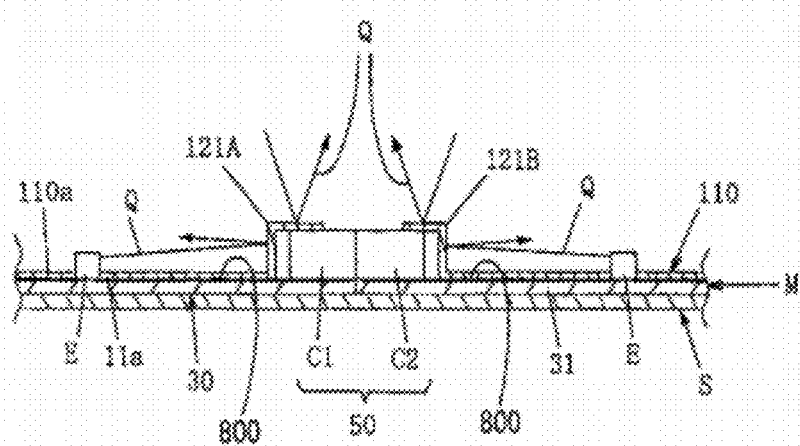
FIG. 8 is a cross sectional view illustrating a portion of a lighting device according to the second embodiment, wherein both end portions are not shown.

The light emitting bar 30 includes a band plate-shaped substrate 31, a wiring (wiring pattern) formed to extend in a longitudinal direction on a surface of the substrate 31, the plurality of semiconductor light emitting devices E arranged in one row on the surface of the substrate 31 and electrically connected to the wiring, and first and second connectors C1, C2 formed in proximity to opposing shorter sides on the surface of the substrate 31 and electrically connected to the wiring. The wiring is shown as element 800 in FIG. 8, which is an expanded view of the area of the connectors. Although FIG. 8 is directed to the second embodiment, wiring 800 is placed in a similar manner in other embodiments.

A light emitting module M is formed in a line form by electrically connecting the first connector C1 and the second connector C2 of the light emitting bars 30 adjacent to each other while the plurality of light emitting bars 30 are arranged in the longitudinal direction (in the direction of an arrow X).

The brightness nonuniformity reduction unit 20 is arranged on a connector connection unit 40 made by electrically connecting the first connector C1 and the second connector C2. The brightness nonuniformity reduction unit 20 reflects light emitted by the semiconductor light emitting device E toward the connector connection unit 40, and is structured to suppress a decrease in brightness at the connector connection unit 40 and around the connector connection unit 40.

In the case of the first embodiment, the light emitting bar 30 has six semiconductor light emitting devices E arranged in one row with a regular interval. One light emitting module M is made by electrically connecting three light emitting bars 30.

As a whole, the planar light emitting unit U has a rectangular light emitting region including nine light emitting modules M arranged in parallel with a regular interval in a lateral direction of the light emitting module M (in the direction of the arrow Y).

Further, the lighting device I according to the first embodiment includes an optical sheet laminated body 40 arranged on the light emitting surface side of the planar light emitting unit U and having a diffuser panel 41 for diffusing lights emitted by the plurality of semiconductor light emitting devices E. It should be noted that FIG. 1 shows the lighting device I from which the optical sheet laminated body 40 has been detached.

The display apparatus D having this lighting device I includes a display panel P on an external surface side (front surface side) of the optical sheet laminated body 40 of the lighting device I and a frame F or the like for holding the display panel P. In the first embodiment, a liquid crystal display apparatus D in which the display panel P is a liquid crystal panel P is shown as an example.

Hereinafter, each constituent element of the liquid crystal display apparatus D having the lighting device I will be described in detail.

<Chassis>

The chassis S is made of a metal such as steel, aluminum, or the like. The chassis S includes a rectangular bottom plate s1 smaller than the liquid crystal panel P, side plates s2 rising from outer ends of respective sides of the bottom plate s1, and a receiving plate s3 extending outward from rising ends of the side plates s2 and bent to the side of the bottom plate s1. The overall shape of the chassis S is a shallow substantially box shape, in which a front side is open.

As shown in FIG. 2 and FIG. 4, the frame F is placed on the receiving plate s3 of the chassis S, and an external peripheries of the reflection sheet 10 and the optical sheet laminated body 40 are sandwiched between the frame F and the receiving plate s3.

Further, attachment holes are formed on the upper surface of the frame F. A bezel f2, the frame F, the chassis S, or the like for holding the liquid crystal panel P can be made integrally by using screws f1 and the like with the attachment holes.

<Liquid Crystal Panel>

The liquid crystal panel P is made with a pair of rectangular glass substrates attached to each other and spaced apart by a predetermined gap, and a liquid crystal is sealed into the gap between the glass substrates.

One of the glass substrates is arranged with switching devices (such as TFTs) each connected to source wirings and gate wirings intersecting at a right angle, pixel electrodes respectively connected to the switching devices, an alignment film, and the like.

The other of the glass substrates is arranged with a color filter including respective coloring units of R (red), G (green), B (blue), and the like arranged in a predetermined order, opposing electrodes, an alignment film, and the like.

Further, a polarization plate is arranged on the outside of both of the glass substrates.

<Optical Sheet Laminated Body>

The optical sheet laminated body 40 has the diffuser panel 41 and two optical sheets 42. The diffuser panel 41 has light diffusing particles arranged in a distributed manner in a plate-shaped member made of synthetic resin. The diffuser panel 41 has a function of diffusing light emitted from the semiconductor light emitting device E, that is, a point source of light, to the side of the liquid crystal panel P, and diffusing a reflected light from the reflection sheet 10 to the side of the liquid crystal panel P.

Examples of optical sheets 42 include a diffusion sheet, a lens sheet, a reflective polarization sheet, and the like, and any one of the above can be selected and used as necessary.

The optical sheet 42 has a function of making, into a planar-shaped light, the light emitted by the semiconductor light emitting device E and passed through the diffuser panel 41.

<Light Emitting Bar and Light Emitting Module>

In the light emitting bar 30, the substrate 31 is a band plate-shaped substrate made of a synthetic resin. A wiring made of a metal film (such as a copper foil) is formed as a predetermined pattern on the surface of the substrate 31.

For example, a white light emitting diode (which may be hereinafter referred to as "LED") may be used as the semiconductor light emitting device E.

In this case, a white light may be emitted as follows. Each LED of the light emitting bar 30 may be made of a blue light emitting chip emitting a blue monochromatic light with a fluorescent material having a light emission peak in a yellow region being applied to the blue light emitting chip and a blue light emitting chip emitting a blue monochromatic light with a fluorescent material having a light emission peak in green and red regions being applied to the blue light emitting chip. Alternatively, a white light may be emitted with a combination of a red LED and an LED emitting a white light with a blue light emitting chip emitting a blue monochromatic light with a fluorescent material having a light emission peak in a green region being applied to the blue light emitting chip, or a white light may be emitted with a combination of red, green, and blue LEDs.

Each LED is electrically connected in series with the wiring on the substrate 31, and a distance between adjacent LEDs is, for example, about 50 mm.

The first and second connectors C1, C2 respectively have block-shaped housings made of synthetic resin. The first connector C1 has a protruding portion protruding outward from an end portion of the substrate 31. The second connector C2 has a concave portion engaging with the protruding portion of the first connector C1.

The synthetic resin constituting the housings of the first and second connectors C1, C2 is preferably a resin which does not expands nor shrinks greatly due to heat and absorbed humidity and has a good light resistance property against a strong light ray of about 10000 cd/m$^2$. More specifically, PET (polyethylene terephthalate) or the like is preferable.

A connector connection unit 50 is formed by electrically, physically connecting the first connector C1 of one of light emitting bars 30 and the second connector C2 of the other of light emitting bars 30, which are adjacent in a longitudinal direction. Thus, the light emitting module M having a predetermined length is formed.

The plurality of light emitting modules M are fixed with a mutual interval of about 50 mm on the bottom plate s1 of the chassis S. The fixing method is not particularly limited, and an example of fixing method includes a method for fixing the light emitting modules M with fixing parts such as rivets and screws (not shown).

In this case, protruding pieces having fixing part insertion holes are integrally arranged on opposing longer sides of the substrate 31 of the light emitting bar 30, and fixing part insertion holes are formed at predetermined positions of the bottom plate s1 of the chassis S. Accordingly, fixing parts are inserted or screwed into the holes from the side of the substrate 31.

Even when the heads of the fixing part come into contact with the later-described reflection sheet 10, and the reflection sheet 10 somewhat rises from the substrate 31, this would not cause any problem as long as the light of the light emitting diodes E does not leak to the side of the substrate 31. However, the reflection sheet 10 is preferably is in contact with the substrate 31 as much as possible.

In this case, for example, when the protruding piece is formed in an L-shaped foot form so as to cause the substrate 31 to rise from the chassis S, the heads of the fixing parts do not come into contact with the reflection sheet 10, and therefore, the reflection sheet 10 can be brought into contact with the substrate 31 without rising from the substrate 31.

Alternatively, at least the surfaces of the fixing parts may be made with a material having a high reflectivity, and the heads of the fixing parts protruding from the upper surface of the substrate 31 may be exposed from the holes formed on the reflection sheets 10. In such case, the light of the light emitting diodes E is reflected with a high reflectivity even when the light is incident upon the heads of the fixing parts.

In the light emitting module M fixed onto the chassis S, an external control unit (not shown) is connected to each light emitting bar 30. This control unit provides electric power needed for lighting each light emitting diode E, and can control drive of each light emitting diode E.

<Reflection Sheet and Brightness Nonuniformity Reduction Unit>

The reflection sheet 10 has a function of increasing the amount of light passing through the optical sheet laminated body 40 by reflecting a direct light emitted by each light emitting diode E, a reflection light of the direct light reflected by the diffuser panel 41, and the like. In FIG. 2 to FIG. 4, arrows Q represent lights emitted by the light emitting diodes E.

On the other hand, the brightness nonuniformity reduction units 20 are arranged at positions of the connector connection units 40 of the light emitting modules M and positions of the first connector C1 and the second connector C2 at both ends of each light emitting module M. The brightness nonuniformity reduction unit 20 has a function of suppressing a decrease in brightness caused by a decrease of reflectivity of the light Q at each of these positions.

Figure 5:
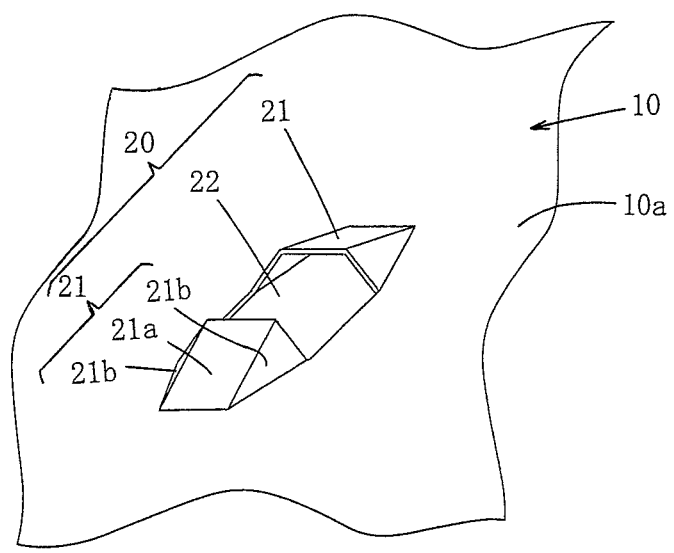
FIG. 5 is a perspective view illustrating a brightness nonuniformity reduction unit arranged integrally on a reflection sheet according to the first embodiment.

The first embodiment shows an example of the above structure (A), in which the brightness nonuniformity reduction unit 20 is integrally formed with the reflection sheet 10. FIG. 5 is a perspective view illustrating the brightness nonuniformity reduction unit 20 arranged integrally on the reflection sheet 10 according to the first embodiment.

More specifically, the reflection sheet 10 is a sheet-like molded piece made of a resin material in which white colorant (such as titanium oxide) is dispersed in a synthetic resin, and the surface of the reflection sheet 10 is white, which is advantageous in terms of light reflectivity.

An example of the synthetic resin serving as the material of the reflection sheet 10 is preferably a resin of which specific gravity is light and which does not expands nor shrinks greatly due to heat and absorbed humidity, wherein the resin has a good light resistance property against a strong light ray of about 10000 cd/m$^2$. More specifically, PET (polyethylene terephthalate) or the like is preferable.

Examples of methods for manufacturing the reflection sheet 10 are as follows. A method (first method) includes forming the resin material into a sheet form, forming later-described holes 11a and opening portion 22 by punching the sheet-like molded piece at predetermined positions, setting the processed sheet in a stamping die having a predetermined shape, and press-forming the sheet while heating the sheet. Another method (second method) includes injection-molding the resin material melted in a die.

A still another method (third method) includes using a resin material without any white colorant to form an original form of the reflection sheet 10 according to the first and second methods and evaporating a metal (such as aluminum) onto a surface of the original form, which is to become the reflection surface. A still another method (fourth method) includes using a resin sheet having an aluminum layer evaporated on one surface thereof to form the reflection sheet 10 according to the first method.

The reflection sheet 10 includes a rectangular bottom plate portion 11 corresponding to the planar light emitting unit U, inclined plate portions 12 rising diagonally from each side of the bottom plate portion 11, and external peripheries 13 extending outward from the rising ends of the inclined plate portions 12. As a whole, the reflection sheet 10 has a rectangular dish shape, in which there is an opening becoming wider toward the front side.

The bottom plate portion 11 of the reflection sheet 10 is formed with the holes 11a at positions corresponding to the light emitting diodes E, and the brightness nonuniformity reduction units 20 are integrally arranged at the positions respectively corresponding to the first and second connectors C1, C2.

FIG. 5 is the perspective view illustrating the brightness nonuniformity reduction unit according to the first embodiment.

As shown in FIG. 1 to FIG. 5, the brightness nonuniformity reduction units 20 are formed at portions of the reflection sheet 10 corresponding to the first and second connectors C1, C2. The brightness nonuniformity reduction unit 20 includes inclined surface portions 21 covering a step between the first connector C1 and the substrate 31 and a step between the second connector C2 and the substrate 31.

As shown in FIG. 1 and FIG. 2, a brightness nonuniformity reduction unit 20 (20A) in a portion corresponding to the first connector C1 at one end in a longitudinal direction of the light emitting module M includes an opening portion 22 formed at a position of the reflection sheet 10 corresponding to the first connector C1 and the inclined surface portion 21 covering a step between the substrate 31 and one end surface (end surface on the side of the light emitting diode E) of the first connector C1 protruding from the opening portion 22 to the side of a reflection surface 10a of the reflection sheet 10.

The opening portion 22 is formed in a shape slightly larger than the first connector C1.

The inclined surface portion 21 has a square surface portion 21a in the middle and triangular surface portions 21b on both sides of the square surface portion 21a (see FIG. 5).

The square surface portion 21a is inclined from an upper end of the one end surface of the first connector C1 to the reflection surface 10a on the side of the light emitting diode E.

The triangular surface portion 21b is inclined from the square surface portion 21a to the reflection surface 10a.

One end surface of the first connector C1 on one end in the longitudinal direction of the light emitting module M is covered by the brightness nonuniformity reduction unit 20A. Therefore, the direct light emitted by the light emitting diode E arranged in proximity to this brightness nonuniformity reduction unit 20A is not incident upon the first connector C1, but is incident upon and reflected by the inclined surface portion 21 of the brightness nonuniformity reduction unit 20A.

A brightness nonuniformity reduction unit 20 (20B) in a portion corresponding to the second connector C2 on the other end in the longitudinal direction of the light emitting module M is also structured in the same manner as the brightness nonuniformity reduction unit 20 (20A), except that the brightness nonuniformity reduction unit 20 (20B) is arranged in the opposite direction to the brightness nonuniformity reduction unit 20A corresponding to the first connector C1.

Therefore, the direct light emitted by the light emitting diode E arranged in proximity to this brightness nonuniformity reduction unit 20B is not incident upon the second connector C2, but is incident upon and reflected by the inclined surface portion 21 of the brightness nonuniformity reduction unit 20B.

The connector connection unit 50 is structured by electrically, physically connecting the first connector C1 and the second connector C2 of two light emitting bars 30 adjacent to each other. The reflection sheet 10 is integrally arranged with a brightness nonuniformity reduction unit 20 (20C) in a portion corresponding to this connector connection unit 50.

As shown in FIG. 1, FIG. 3, and FIG. 5, the brightness nonuniformity reduction unit 20C corresponding to the connector connection unit 50 is an element made by combining the brightness nonuniformity reduction unit 20A corresponding to the first connector C1 and the brightness nonuniformity reduction unit 20B corresponding to the second connector C2.

Therefore, the direct light emitted by the light emitting diode E arranged in proximity to this brightness nonuniformity reduction unit 20C is not incident upon the first and second connectors C1, C2, but is incident upon and reflected by the inclined surface portions 21, 21 of the brightness nonuniformity reduction unit 20C.

However, the upper surfaces and both side surfaces of the housings of the connector connection units 50 and the first and second connectors C1, C2 at both ends that are not connected with each other are exposed portions that are not covered by the brightness nonuniformity reduction units 20. Therefore, when reflection light emitted by the light emitting diode E and reflected multiple times between the reflection plate 10 and the diffuser panel 41 is incident upon the exposed portions, a part of the reflection light is absorbed.

Therefore, the housings of the first and second connectors C1, C2 are preferably formed with a white resin material including a mixture of a synthetic resin such as PET and a white colorant (such as titanium oxide) so as to reflect the light emitted by the light emitting diode E with a high reflectivity.

According to the lighting device I thus structured, a part of the light emitted by each light emitting diode E directly passes through the optical sheet laminated body 40, and a part of the light is reflected multiple times between the reflection plate 10 and the diffuser panel 41 and thereafter passes through the optical sheet laminated body 40.

At this occasion, as described above, the direct lights emitted by the light emitting diodes E to the connector connection units 50 and the first and second connectors C1, C2 on both ends are reflected with a high reflectivity by each brightness nonuniformity reduction unit 20 arranged on the reflection sheet 10. Therefore, the nonuniformity of brightness of the (external) light emitting surface of the optical sheet laminated body 40 is suppressed compared with a case of a reflection sheet 10X without any brightness nonuniformity reduction unit 20 as shown in FIG. 6.

Figure 6:
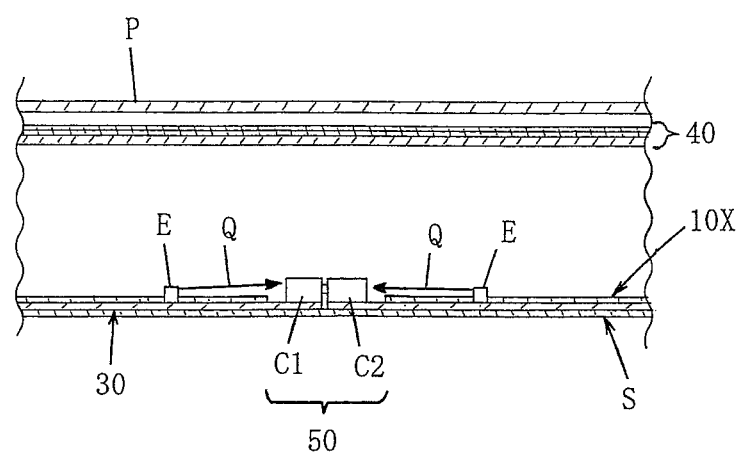
FIG. 6 is a cross sectional view illustrating a comparative example of a lighting device having a reflection sheet without any brightness nonuniformity reduction unit, wherein both end portions are not shown.

It should be noted that the same constituent elements in FIG. 6 as the constituent elements in FIG. 2 to FIG. 4 are denoted with the same reference numerals.

In the case of FIG. 6, if the housings of the first and second connectors C1, C2 are formed with the white resin material, the reflectivity can be increased. However, the reflection light of the direct light emitted by the light emitting diodes E and incident upon the vertical end portions of the first and second connectors C1, C2 are less likely to be reflected to the diffuser panel 41. Therefore, on the light emitting surface of the optical sheet laminated body 40, the brightness of the portions corresponding to the connector connection units 50 and the first and second connectors C1, C2 on both ends easily decrease than the brightness of the other portions.

In contrast, in the case of FIG. 3, the brightness nonuniformity reduction units 20 corresponding to the connector connection units 50 and the first and second connectors C1, C2 on both ends can use the inclined surface portions 21 (in particular, the square surface portions 21a) to reflect the direct light emitted by the light emitting diodes E to the diffuser panel 41 immediately above. Therefore, the nonuniformity of brightness can be suppressed on the light emitting surface of the optical sheet laminated body 40. Further, if the housings of the first and second connectors C1, C2 are formed with the white resin material, the nonuniformity of brightness is further suppressed.

Second Embodiment

Figure 7:
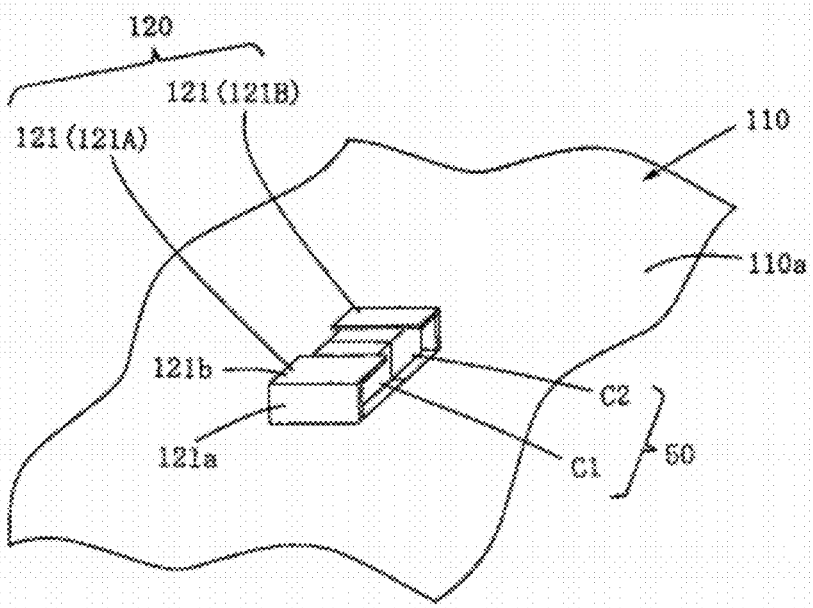
FIG. 7 is a perspective view illustrating a portion of a second embodiment of a lighting device according to the present invention.

FIG. 7 is a perspective view illustrating a portion of a second embodiment of a lighting device according to the present invention. FIG. 8 is a cross sectional view illustrating a portion of the lighting device according to the second embodiment, wherein both end portions are not shown. In FIG. 7 and FIG. 8, the same constituent elements as the constituent elements in FIG. 1 to FIG. 5 are denoted with the same reference numerals.

The second embodiment is the same as the first embodiment except for a brightness nonuniformity reduction portion 120. Hereinafter, portions of the second embodiment different from those of the first embodiment will be mainly described.

The brightness nonuniformity reduction unit 120 according to the second embodiment is structured according to the structure (B).

More specifically, the brightness nonuniformity reduction unit 120 includes bent covering portions 121 formed with cutouts in a portion of a reflection sheet 110 corresponding to first and second connectors C1, C2, wherein the cutout portions are bent so as to cover the external surfaces of the first and second connectors C1, C2.

In FIG. 7 and FIG. 8, the brightness nonuniformity reduction unit 120 corresponding to the connector connection unit 50 is shown. Likewise, the brightness nonuniformity reduction units (not shown) corresponding to the first and second connectors at both ends of the light emitting modules M that are not connected with each other can also be formed in the same manner.

A bent covering portion 121 (121A) corresponding to the first connector C1 includes a rising surface portion 121a rising from a reflection surface 110a to substantially the same height as the height of the first connector C1 so as to cover the end surface of the first connector C1 and a bent surface portion 121b bent from the upper end of the rising surface portion 121a so as to cover the upper surface of the first connector C1.

The bent covering portion 121 (121B) corresponding to the second connector C2 has the same structure except that it is arranged in the opposite direction to the bent covering portion 121A corresponding to the first connector C1.

In the case of the brightness nonuniformity reduction unit 120 corresponding to the connector connection unit 50, the pair of bent covering portions 121A, 121B can be formed by forming an H-shaped cutout in the reflection sheet 110.

In the case of the brightness nonuniformity reduction units corresponding to the first and second connectors at both ends of the light emitting modules M that are not connected with each other, the same bent covering portions as the bent covering portions 121A, 121B can be formed by forming a U-shaped cutout in the reflection sheet 110.

According to this brightness nonuniformity reduction portion 120, the direct light Q emitted by the closest light emitting diode E can be reflected by the rising surface portion 121a with a high reflectivity, and in addition, a multiple-reflected light can be reflected by the bent surface portion 121b with a high reflectivity.

In this case, portions of the upper surfaces and both side surfaces of the first and second connectors C1, C2 are not covered by the brightness nonuniformity reduction unit 120. Therefore, the housings of the first and second connectors C1, C2 are preferably formed with the white resin material so as to reflect the light emitted by the light emitting diode E with a high reflectivity.

Third Embodiment

Figure 9:
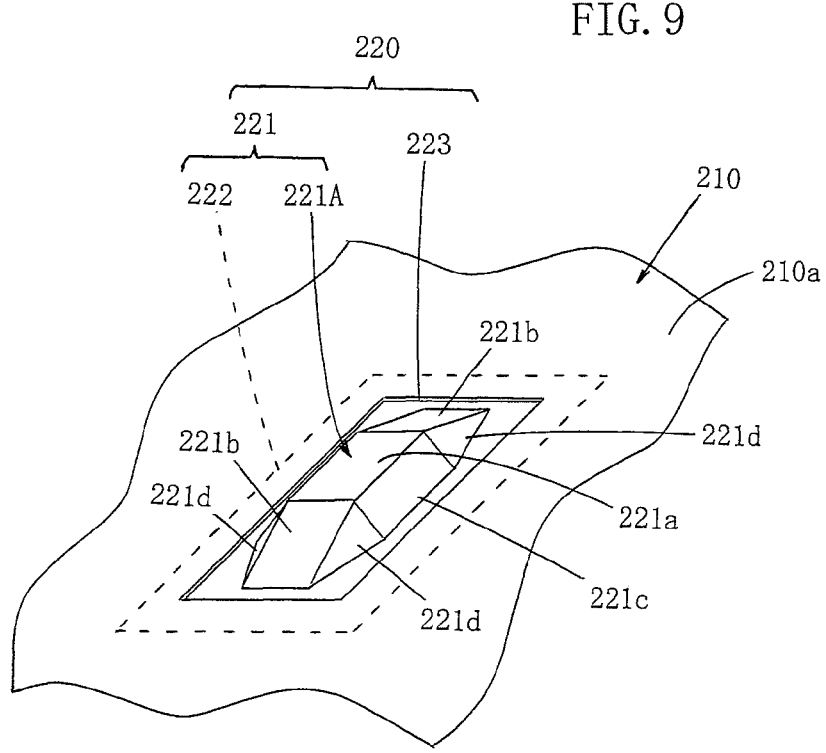
FIG. 9 is a perspective view illustrating a portion of a third embodiment of a lighting device according to the present invention.
Figure 10:
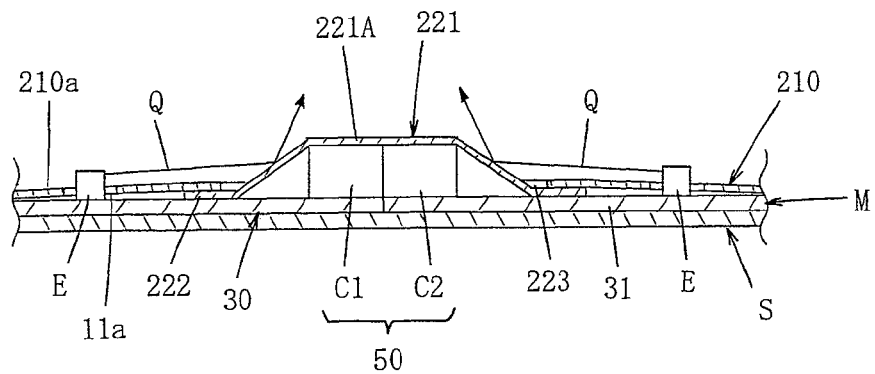
FIG. 10 is a cross sectional view illustrating a portion of a lighting device according to the third embodiment, wherein both end portions are not shown.

FIG. 9 is a perspective view illustrating a portion of a third embodiment of a lighting device according to the present invention. FIG. 10 is a cross sectional view illustrating a portion of the lighting device according to the third embodiment, wherein both end portions are not shown. In FIG. 9 and FIG. 10, the same constituent elements as the constituent elements in FIG. 1 to FIG. 5 are denoted with the same reference numerals.

The third embodiment is the same as the first embodiment except for a brightness nonuniformity reduction portion 220. Hereinafter, portions of the third embodiment different from those of the first embodiment will be mainly described.

The brightness nonuniformity reduction unit 220 according to the third embodiment is structured according to the structure (C).

More specifically, the brightness nonuniformity reduction unit 220 includes an opening portion 222 formed in a portion of a reflection sheet 210 corresponding to first and second connectors C1, C2 and a reflection cap 221 covering the entire first and second connectors C1, C2 protruding from the opening portion 222 and having inclined surface portions 221b, 221c, 221d covering the step between the first connector C1 and the substrate 31 and the step between the second connector C2 and the substrate 31.

In FIG. 9 and FIG. 10, the brightness nonuniformity reduction unit 220 corresponding to the connector connection unit 50 is shown. Likewise, brightness nonuniformity reduction units (not shown) corresponding to the first and second connectors at both ends of the light emitting modules M that are not connected with each other can also be formed in the same manner.

The reflection cap 221 is made of a patch reflection sheet made of the same resin material as the reflection sheet 210, and includes an external peripheral portion 222 and a covering portion 221A formed with a swelled central portion of the sheet so as to cover the entire first and second connectors C1, C2.

The covering portion 221A includes a rectangular flat surface portion 221a covering the upper surface of the connector connection unit 50, the rectangular inclined surface portions 221b inclined from the shorter sides of the rectangular flat surface portion 221a to the external peripheral portions 222, the rectangular inclined surface portions 221c inclined from the longer sides of the rectangular flat surface portion 221a to the external peripheral portions 222, and the triangular inclined surface portions 221d between the inclined surface portions 221b and the inclined surface portions 221c.

The opening portion 223 is formed to have a size larger than the covering portion 221A of the reflection cap 221 but smaller than the external peripheral portion 222.

The reflection cap 221 is placed to cover the connector connection unit 50, and the reflection sheet 210 is placed over them, so that the covering portion 221A protrudes from the opening portion 223. Accordingly, the external peripheral portion 222 is pressed by the reflection sheet 210, and therefore, the reflection cap 221 does not come off.

In the case of the brightness nonuniformity reduction units corresponding to the first and second connectors at both ends of the light emitting modules M that are not connected with each other, the covering portion 221A of the brightness nonuniformity reduction unit 220 as shown in FIG. 9 and FIG. 10 may cut into substantially two parts.

According to this brightness nonuniformity reduction unit 220, the direct light Q and the multiple-reflected light emitted by the light emitting diode E are reflected with a high reflectivity by the covering portion 221A (the rectangular flat surface portions 221a and the inclined surface portions 221b, 221c, 221d on eight surfaces around the rectangular flat surface portions 221a) and the external peripheral portion 222 of the reflection cap 221, and accordingly, no light is incident upon the first and second connectors C1, C2 and the substrate 31.

As a result, the nonuniformity of brightness of the lighting device does not increase even when the housings of the first and second connectors C1, C2 are not formed with the white resin material.

Fourth Embodiment

Figure 11:
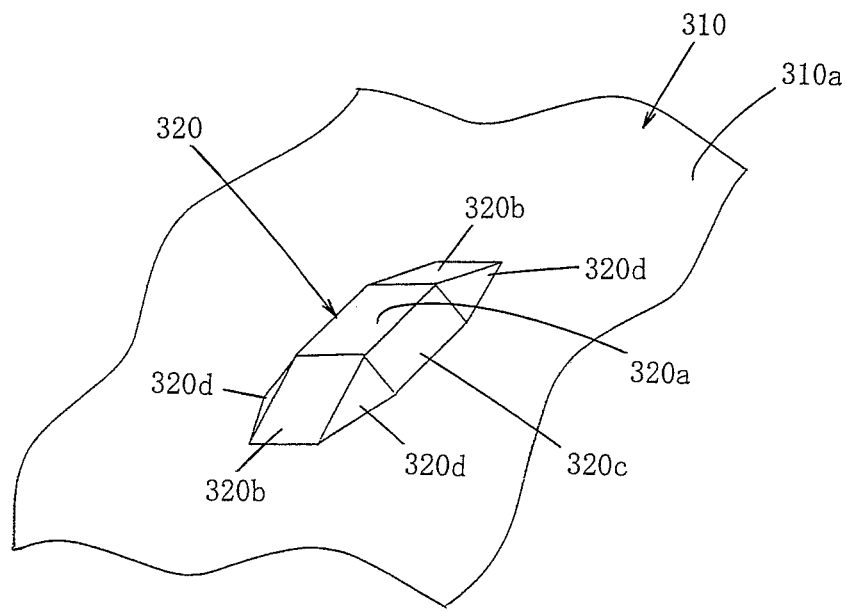
FIG. 11 is a perspective view illustrating a portion of a fourth embodiment of a lighting device according to the present invention.
Figure 12:
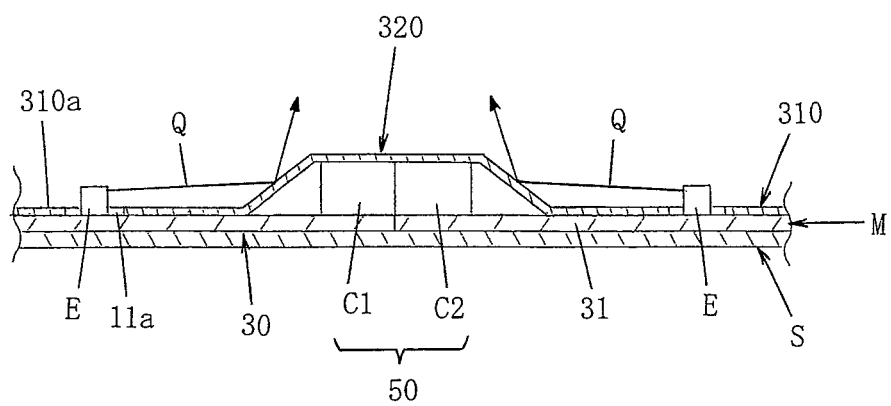
FIG. 12 is a cross sectional view illustrating a portion of a lighting device according to the fourth embodiment, wherein both end portions are not shown.

FIG. 11 is a perspective view illustrating a portion of a fourth embodiment of a lighting device according to the present invention. FIG. 12 is a cross sectional view illustrating a portion of the lighting device according to the fourth embodiment, wherein both end portions are not shown. In FIG. 11 and FIG. 12, the same constituent elements as the constituent elements in FIG. 1 to FIG. 5 are denoted with the same reference numerals.

The fourth embodiment is the same as the first embodiment except for a brightness nonuniformity reduction portion 320. Hereinafter, portions of the fourth embodiment different from those of the first embodiment will be mainly described.

The brightness nonuniformity reduction unit 320 according to the fourth embodiment is structured according to the structure (D).

More specifically, the brightness nonuniformity reduction unit 320 includes inclined surface portions 320b, 320c, 320d and a rectangular flat surface portion 320a formed in a portion of a reflection sheet 310 corresponding to first and second connectors C1, C2 so as to cover the entire first and second connectors C1, C2 and cover the step between the first connector C1 and the substrate 31 and the step between the second connector C2 and the substrate 31.

In FIG. 11 and FIG. 12, the brightness nonuniformity reduction unit 320 corresponding to the connector connection unit 50 is shown. In this brightness nonuniformity reduction unit 320, the covering portion 221A (see FIG. 9) of the reflection cap 221 according to the third embodiment is integrally arranged with the reflection sheet 310.

In the case of the brightness nonuniformity reduction units corresponding to the first and second connectors at both ends of the light emitting modules M that are not connected with each other, the brightness nonuniformity reduction unit 320 as shown in FIG. 11 and FIG. 12 may cut into substantially two parts.

Like the third embodiment, according to the brightness nonuniformity reduction unit 320, the direct light Q and the multiple-reflected light emitted by the light emitting diode E is reflected with a high reflectivity by the rectangular flat surface portions 320a and the inclined surface portions 320b, 320c, 320d on eight surfaces around the rectangular flat surface portions 320a, and accordingly, no light is incident upon the first and second connectors C1, C2 and the substrate 31.

As a result, the nonuniformity of brightness of the lighting device does not increase even when the housings of the first and second connectors C1, C2 are not formed with the white resin material. In addition, there is an advantage in that the number of parts does not increase.

Fifth Embodiment

Figure 13:
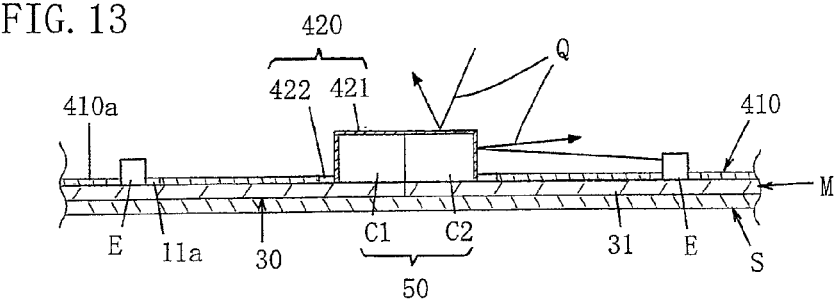
FIG. 13 is a cross sectional view illustrating a portion of a fifth embodiment of a lighting device according to the present invention, wherein both end portions are not shown.

FIG. 13 is a cross sectional view illustrating a portion of a fifth embodiment of a lighting device according to the present invention, wherein both end portions are not shown. In FIG. 13, the same constituent elements as the constituent elements in FIG. 1 to FIG. 5 are denoted with the same reference numerals.

The fifth embodiment is the same as the first embodiment except for a brightness nonuniformity reduction portion 420. Hereinafter, portions of the fifth embodiment different from those of the first embodiment will be mainly described.

The brightness nonuniformity reduction unit 420 according to the fifth embodiment is structured according to the structure (E).

More specifically, first and second connectors C1, C2 have block-shaped housings, and the brightness uniformity reduction unit 420 includes an opening portion 422 in a portion of a reflection sheet 410 corresponding to the first and second connectors C1, C2 and a reflection film 421 laminated on the external surface of the first and second connectors C1, C2 protruding from the opening portion 422.

The reflection film 421 is not particularly limited as long as the reflection film 421 is formed with a material having a reflectivity higher than that of the housings of the first and second connectors C1, C2. Examples of materials of the reflection film 421 include an evaporated film made of a metal (such as Al) and a white resin film (coated film) including white colorant.

In FIG. 13, the brightness nonuniformity reduction unit 420 corresponding to the connector connection unit 50 is shown. Likewise, brightness nonuniformity reduction units (not shown) corresponding to the first and second connectors at both ends of the light emitting modules M that are not connected with each other can also be formed in the same manner.

Sixth Embodiment

Figure 14:
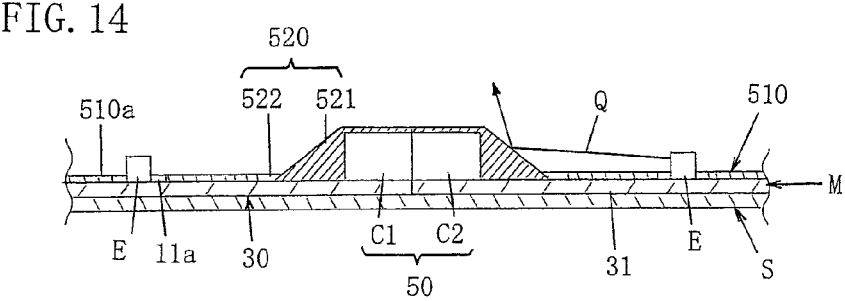
FIG. 14 is a cross sectional view illustrating a portion of a sixth embodiment of a lighting device according to the present invention, wherein both end portions are not shown.

FIG. 14 is a cross sectional view illustrating a portion of a sixth embodiment of a lighting device according to the present invention, wherein both end portions are not shown. In FIG. 14, the same constituent elements as the constituent elements in FIG. 1 to FIG. 5 are denoted with the same reference numerals.

The sixth embodiment is the same as the first embodiment except for a brightness nonuniformity reduction portion 520. Hereinafter, portions of the sixth embodiment different from those of the first embodiment will be mainly described.

The brightness nonuniformity reduction unit 520 according to the sixth embodiment is a modification of the brightness nonuniformity reduction unit 420 described in the fifth embodiment.

More specifically, the brightness nonuniformity reduction unit 520 includes an opening portion 522 in a portion of a reflection sheet 410 corresponding to the first and second connectors C1, C2 and a reflection film 521 laminated on the external surface of the housings of the first and second connectors C1, C2 protruding from the opening portion 522. The reflection film 521 is formed into the same shape as the brightness nonuniformity reduction unit 320 as illustrated in FIG. 11.

For example, the reflection film 521 having inclined surface portions on four surfaces of the housing of the first connector C1 other than connection surfaces with a substrate and the second connector can be formed by setting, in a die, the housing of the first connector C1 and a partially hardened material made of a resin material including white colorant and hardening the resin material by heating.

Alternatively, the reflection film 521 may be formed by forming the housing of the first connect C1 into a shape having the inclined surface portions in advance and forming an evaporated film made of a metal (such as Al) on the upper surface and the inclined surface portions of the housing.

It should be noted that the housing of the first connector C1 having the inclined surface portions made be formed with a resin material including white colorant.

The reflection film 521 corresponding to the second connector C2 is also the same as the above.

According to this brightness nonuniformity reduction unit 520, the light can be reflected upward more easily compared with the brightness nonuniformity reduction unit 420 according to the fifth embodiment.

Seventh Embodiment

Figure 15:
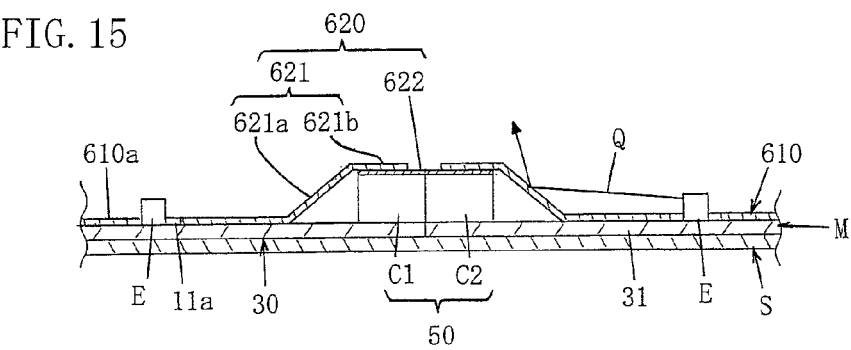
FIG. 15 is a cross sectional view illustrating a portion of a seventh embodiment of a lighting device according to the present invention, wherein both end portions are not shown.

FIG. 15 is a cross sectional view illustrating a portion of a seventh embodiment of a lighting device according to the present invention, wherein both end portions are not shown. In FIG. 15, the same constituent elements as the constituent elements in FIG. 1 to FIG. 5 are denoted with the same reference numerals.

The seventh embodiment is the same as the first embodiment except for a brightness nonuniformity reduction portion 620. Hereinafter, portions of the seventh embodiment different from those of the first embodiment will be mainly described.

The brightness nonuniformity reduction unit 620 according to the seventh embodiment is an example of combination of the bent covering portion 121 according to the second embodiment (FIG. 7) and the reflection film 421 according to the fifth embodiment (FIG. 13).

This brightness nonuniformity reduction unit 620 includes a bent covering portion 621 formed by bending a cutout portion of a reflection sheet 610 and a reflection film 622 formed on the external surface of the housings of the first and second connectors C1, C2.

The bent covering portion 621 corresponding to the first connector C1 includes an inclined surface portion 621a rising from a reflection surface 610a so as to cover the end surface of the housing of the first connector C1 and a bent surface portion 621b bent from the upper end of the inclined surface portion 621a so as to cover a portion of the upper surface of the housing of the first connector C1. It should be noted that the inclined surface portion 21 according to the first embodiment (see FIG. 5) may be used instead of the bent covering portion 621.

The reflection film 622 corresponding to the first connector C1 may be formed at least on the external surface portion of the housing of the first connector C1 that is not covered by the bent covering portion 621. In the seventh embodiment, the reflection film 622 is formed on the upper surface and both side surfaces of the housing.

The bent covering portion 621 and the reflection film 622 corresponding to the second connector C2 are also the same as the above.

Eighth Embodiment

Figure 16:
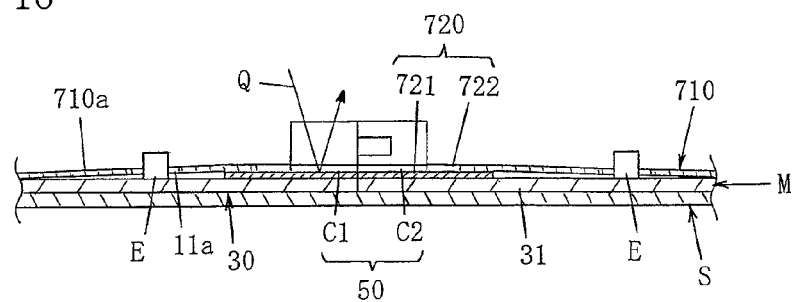
FIG. 16 is a cross sectional view illustrating a portion of an eighth embodiment of a lighting device according to the present invention, wherein both end portions are not shown.

FIG. 16 is a cross sectional view illustrating a portion of an eighth embodiment of a lighting device according to the present invention, wherein both end portions are not shown. In FIG. 16, the same constituent elements as the constituent elements in FIG. 1 to FIG. 5 are denoted with the same reference numerals.

The eighth embodiment is the same as the first embodiment except for a brightness nonuniformity reduction portion 720. Hereinafter, portions of the eighth embodiment different from those of the first embodiment will be mainly described.

The brightness nonuniformity reduction unit 720 according to the eighth embodiment is structured according to the structure (F).

More specifically, first and second connectors C1, C2 have block-shaped transparent housings made of an optically transparent resin (such as PET or polycarbonate). The brightness nonuniformity reduction unit 720 includes an opening portion 722 formed in a portion of a reflection sheet 710 corresponding to first and second connectors C1, C2 and allowing the first and second connectors C1, C2 to protrude and a reflection film 721 laminated at a position of a surface of the substrate corresponding to the first and second connectors C1, C2.

The reflection film 721 corresponding to the first connector C1 is made of, for example, a white color insulation resin film including white colorant, and is formed at least in a joining region of the first connector C1 on the surface of the substrate 31. At this occasion, it is necessary to electrically connect a terminal of the first connector C1 and a wiring on the surface of the substrate 31, and therefore, the reflection film 721 is removed from the connection portion.

The reflection film 721 corresponding to the second connector C2 is the same as the above.

According to this brightness nonuniformity reduction unit 720, when the multiple-reflected light Q of the light emitting diode E is incident upon the transparent housings of the first and second connectors C1, C2, a part of the light passes through the housings, and is then reflected by the reflection film 721. Thereafter, the light passes through the housings again. Further, the direct light emitted by the light emitting diode E also passes through the housings. Therefore, the first and second connectors C1, C2 absorb less light, and the nonuniformity of brightness is suppressed on the light emitting surface of the lighting device.

Ninth Embodiment

FIGS. 17A to 17D are explanatory views illustrating the ninth embodiment of a lighting device according to the present invention.

In the first to eighth embodiments, the lighting device serving as a direct backlight device for a display apparatus is shown as an example. In the ninth embodiment, lighting devices of various sizes serving as substitutes for fluorescent lights are shown examples.

FIGS. 17A to 17D illustrate four lighting devices which are different in the number of light emitting bars 30 constituting a light emitting module M, the number of light emitting modules M, and arrangement patterns of the light emitting modules M. FIGS. 17A to 17D illustrate concepts of these combinations. In FIGS. 17A to 17D, a symbol F represents a region corresponding to a bottom plate portion of a reflection sheet.

It should be noted that the light emitting bar 30 is the same as what have been described in the first to eighth embodiments. However, the number of light emitting diodes is set to any number.

Figure 17A:
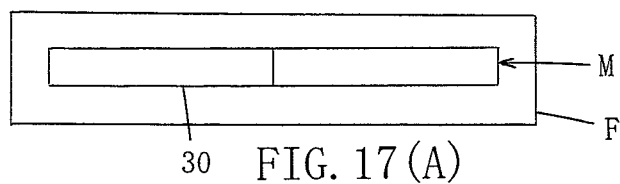
FIGS. 17A to 17D are explanatory views illustrating a ninth embodiment of a lighting device according to the present invention.
Figure 17B:
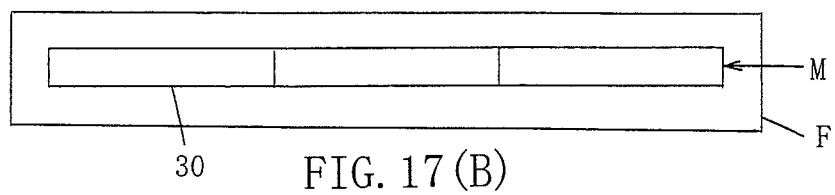

FIG. 17A illustrates a lighting device having one light emitting module M including two light emitting bars 30 electrically connected. FIG. 17B illustrates a lighting device having one light emitting module M including three light emitting bars 30 electrically connected.

The above lighting devices are suitable for a lighting in a narrow area and a small area such as an indoor corridor, a toilet, a lavatory, a bathroom, a dressing room, a passenger car of an electric train, a cabin of an airplane, and the like.

Figure 17C:
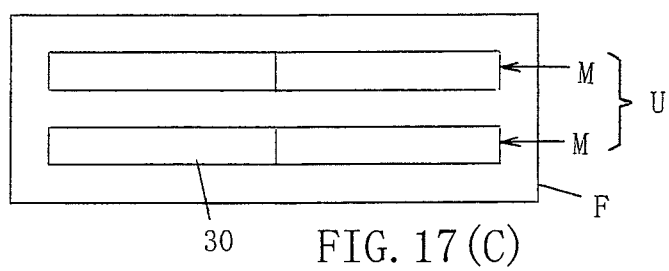

FIG. 17C illustrates a lighting device having two light emitting modules M arranged in parallel in a lateral direction including two light emitting bars 30 electrically connected.

In this lighting device, a planar light emitting unit U is formed with the two light emitting modules M. For example, this lighting device is suitable for a lighting for a portion of a room which is to be particularly illuminated, such as surroundings of a desk and a working table.

Figure 17D:
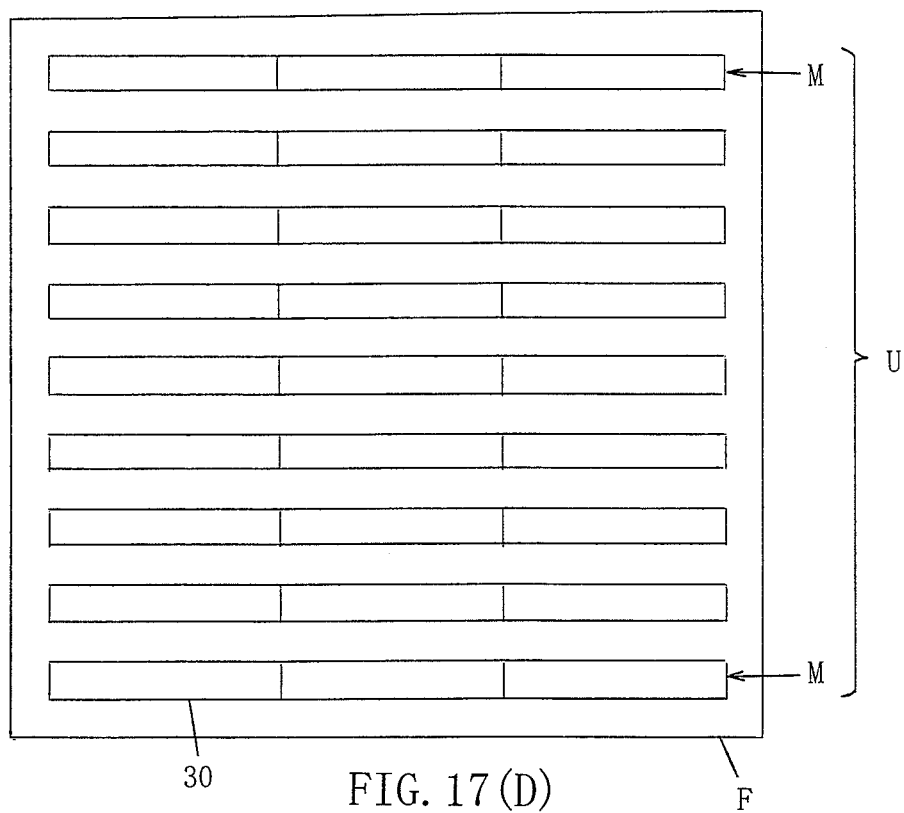

FIG. 17D illustrates a lighting device having nine light emitting modules M arranged in parallel in a lateral direction including three light emitting bars 30 electrically connected.

This lighting device is made by further increasing the light emitting area of the planar light emitting unit U. For example, this lighting device is suitable for a lighting of a large area such as lobbies of facilities such as a commercial building, a hotel, a theater, and the like, a concourse of a station, an airport, and the like, and a museum.

In each lighting device as shown in FIGS. 17A to 17D, the number of light emitting bars 30 and the number of light emitting modules M are not limited to the examples shown in the figures, and can be freely set according to a size of an area to be illuminated, the degree of necessary illumination, and the like.

As described above, according to the present invention, it is easy to assemble a lighting device of various sizes and shapes according to the number of light emitting bars 30 constituting a light emitting module M, the number of light emitting modules M, arrangement patterns of the light emitting modules M, and combinations of these.

Tenth Embodiment

Figure 18:
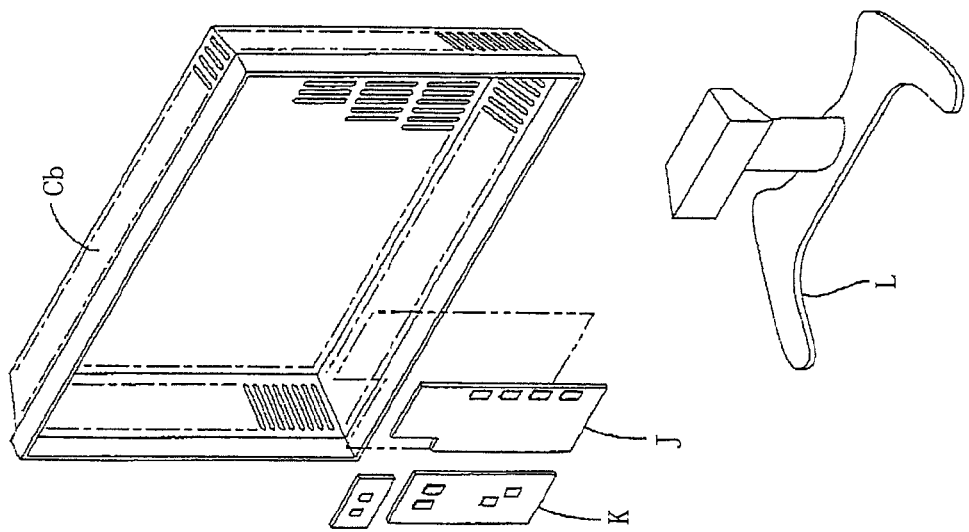
FIG. 18 is an exploded perspective view illustrating an overview of a television receiver using a display apparatus according to the present invention.
Figure 18:
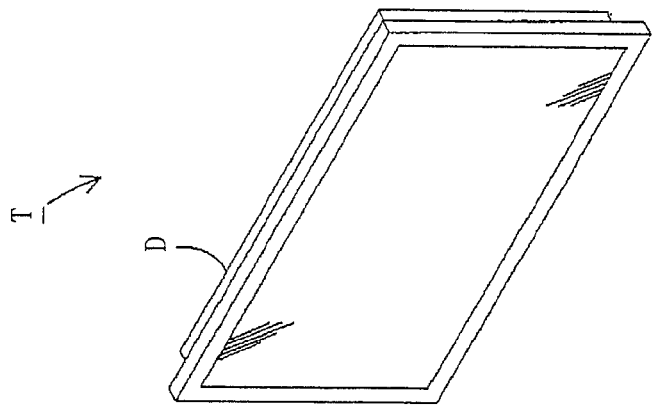
Figure 18:
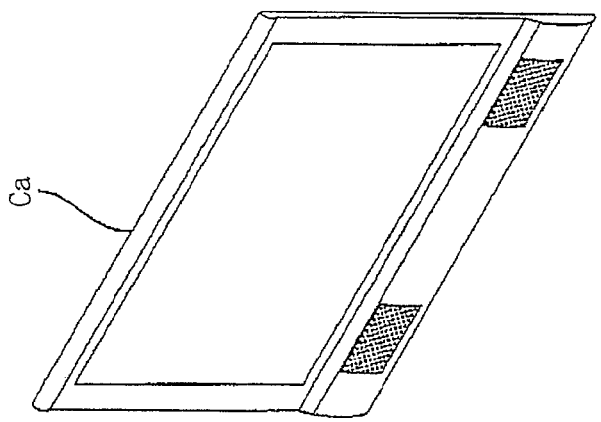

FIG. 18 is an exploded perspective view illustrating an overview of a television receiver using a display apparatus according to the present invention.

This television receiver T includes the liquid crystal display apparatus D according to the first embodiment, front and back cabinets Ca, Cb for containing the liquid crystal display apparatus D in a sandwiching manner, a power supply substrate J, a tuner substrate K, and a stand L.

According to this television receiver, the liquid crystal display apparatus D can display still pictures and motion pictures with excellent viewability, while the nonuniformity of brightness is suppressed.

Other Embodiments

In the lighting device according to the first to tenth embodiments, a diffusing lens may be arranged on each light emitting diode E so as to further reduce the nonuniformity of brightness.

The inclined surface portions of the brightness nonuniformity reduction unit according to the first, third, and fourth embodiments may not be flat surfaces, and may be curved surfaces.

The present invention is applicable to a lighting device supporting various shapes and sizes, a liquid crystal display apparatus in which this lighting device is used as a backlight, and a liquid crystal television receiver.

What is claimed is:

1. A lighting device comprising:
a light emitting module including a plurality of electrically connected light emitting bars each having a plurality of semiconductor light emitting devices;
a chassis for containing the light emitting module and having a discharge opening for discharging light from each semiconductor light emitting device to an outside;
a reflection sheet arranged in the chassis to reflect the light of the plurality of semiconductor light emitting devices to a side of the discharge opening; and
a brightness nonuniformity reduction unit,
wherein each of the said lighting bars include:
a band plate-shaped substrate;
a wiring formed to extend in a longitudinal direction on one surface of the substrate;
the plurality of semiconductor light emitting devices arranged in one row on the one surface of the substrate and electrically connected to the wiring; and
first and second connectors formed in proximity to opposing shorter sides of the substrate on the one surface of the substrate and electrically connected to the wiring, each of the first and second connectors having a top side surface, bottom side surface and opposing side surfaces extending between said bottom and top side surfaces,
wherein the semiconductor light emitting device is a light emitting diode emitting a white light that has a light component in a horizontal direction,
wherein the light emitting module is formed in a bar shape by electrically connecting the first connector and the second connector so as to be aligned in a longitudinal direction of two light emitting bars adjacent to each other when the plurality of light emitting bars are arranged in a longitudinal direction,
wherein the reflection sheet has at least a plurality of corresponding holes through which the plurality of semiconductor light emitting devices are inserted, and the reflection sheet is arranged on the one surface of the substrate of the light emitting module while the semiconductor light emitting devices are inserted into the corresponding holes,
and wherein the brightness nonuniformity reduction unit includes an inclined surface portion, the inclined surface portion being arranged in proximity to a position of the first and second connectors of each light emitting bar, and the inclined surface portion covering said side surfaces of the first and second connectors so as to suppress a decrease in brightness around the first and second connectors by reflecting in a horizontal direction light emitted by the semiconductor light emitting device to the first and second connectors.

2. The lighting device according to claim 1, wherein the light emitting module comprises a plurality of light emitting modules
wherein the plurality of light emitting modules are arranged in parallel in the chassis in a lateral direction thereof to constitute a planar light emitting unit,
and wherein the reflection sheet is integrally formed on an entire region of the planar light emitting unit.

3. The lighting device according to claim 1, wherein the inclined surface portion of the brightness nonuniformity reduction unit is integrally formed on the reflection sheet so as to cover a step between the first connector and the substrate and a step between the second connector and the substrate.

4. The lighting device according to claim 3, wherein the brightness nonuniformity reduction unit is formed in a shape completely covering all of the sides of the first and second connectors.

5. The lighting device according to claim 1, wherein the inclined surface portion of the brightness nonuniformity reduction unit includes a reflection cap for covering the entire first and second connectors protruding from an opening portion formed in a portion of the reflection sheet corresponding to the first and second connectors and covering a step between the first connector and the substrate and a step between the second connector and the substrate.

6. The lighting device according to claim 1, further comprising a diffuser panel attached to the discharge openings of the chassis so as to diffuse and pass the light emitted by the plurality of semiconductor light emitting devices.

7. A display apparatus comprising:
the lighting device according to claim 6; and
a display panel for displaying by using light emitted by the lighting device.

8. A display apparatus according to claim 7, wherein the display panel is a liquid crystal panel using a liquid crystal.

9. A television receiver comprising the display apparatus according to claim 7.

* * * * *